No. 674,143. Patented May 14, 1901.
H. J. VOGEL.
SPITTOON.
(Application filed Nov. 15, 1900.)
(No Model.)

WITNESSES:
O. I. Gast.
Geo. L. Wheelock.

INVENTOR
Henry J. Vogel
BY
ATTORNEYS

THE NORRIS PETERS CO., PHOTO-LITHO., WASHINGTON, D. C.

UNITED STATES PATENT OFFICE.

HENRY J. VOGEL, OF BROOKLYN, NEW YORK, ASSIGNOR TO WILLIAM VOGEL AND BROTHERS, OF SAME PLACE.

SPITTOON.

SPECIFICATION forming part of Letters Patent No. 674,143, dated May 14, 1901.

Application filed November 15, 1900. Serial No. 36,549. (No model.)

*To all whom it may concern:*

Be it known that I, HENRY J. VOGEL, a citizen of the United States, residing at New York, borough of Brooklyn, and State of New York, have invented certain new and useful Improvements in Spittoons, of which the following is a specification.

This invention relates to spittoons or cuspidors; and one object of the invention is to provide a spittoon which may be readily cleaned and which is so constructed that no accummulation of dirt can settle therein.

Further objects are to provide a spittoon which is composed of a few separable parts, which can be cheaply manufactured, and which is durable.

My invention consists of certain novel features of construction to be hereinafter described and then claimed.

Figure 1:
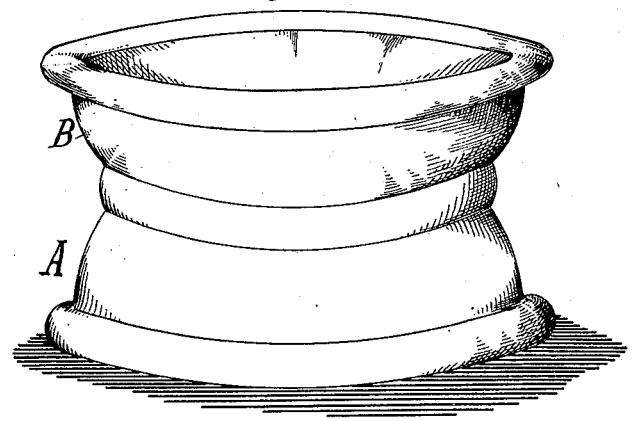
Figure 2:
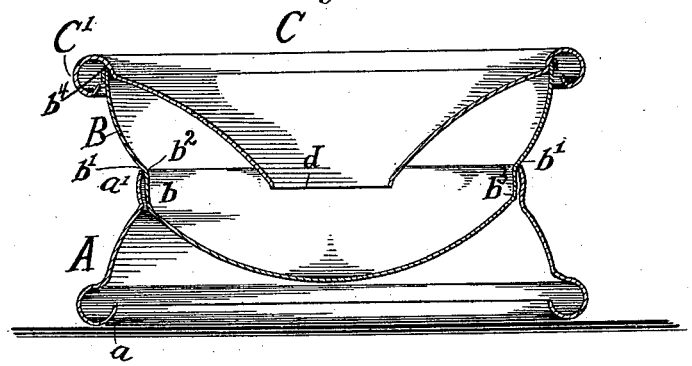
Figure 3:
Figure 3:
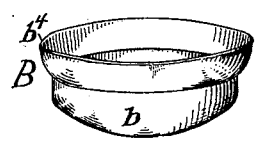
Figure 3:

In the accompanying drawings, Figure 1 is a perspective view of my improved spittoon. Fig. 2 is a central vertical section of the same, and Fig. 3 is a smaller perspective view showing the three members of the spittoon separated and in a position in which they may be fitted together.

Referring to the drawings, A indicates the base of the spittoon, which is formed in approximate frusto-conical shape, having its lower edge formed with a rounded-in and upturned flange $a$, its upper portion being formed with a somewhat outwardly curved annular slip-flange $a'$, which preferably fits tightly, yet removably, onto the bowl of the spittoon, although it may be brazed or soldered thereon, as desired.

B indicates the bowl, which is formed with a contacted lower portion $b$, the exterior diameter of which corresponds with the interior diameter of the slip-flange $a'$ of the base A, so that the said parts may fit snugly together. The contracted portion $b$ leaves a shoulder $b'$ above, so that when the bowl is pushed down as far as possible the shoulder will rest upon the upper edge of the slip-flange $a'$. The bowl is deep enough so that its lower portion hangs like a pot within the base A. The inside corners $b^2$ $b^3$ of the bowl B are rounded, and, in fact, there are no corners, cracks, or crevices inside the bowl into which accumulations might lodge. The rim $b^4$ of the bowl is spun, so as to form a bead and not present a sharp edge, which might cut the hands.

C indicates the top, formed with the usual opening $d$. The top is frusto-conical in shape, and an inturned underhanging flange $C'$ is spun on its outer edge, so as to form an annular groove, which receives the upper edge of the bowl when the top is placed thereon.

All parts of the spittoon are pressed and stamped out of sheet metal, and each member A B C is formed of one piece, so that there are no joints except when the members are fitted together; but they can be readily separated when desired in cleaning the spittoon. By forming the bowl as shown and described it is an easy matter to clean the device, as no dirt or sediment of any kind can find lodgment therein. The bowl flares more or less from bottom to top, so that after it has been thoroughly cleaned and turned upside down everything in it will drain out without any hindrance. Constructed as described the corresponding parts of a large number of spittoons may be separately packed in comparatively small space for shipment and transportation.

What I claim is—

1. A spittoon, composed solely of three integral sheet-metal members, one of said members being a bowl constructed with a shallow contracted lower portion having approximately vertical walls, and with a flaring upper portion, said bowl having only rounded interior corners or recesses, and said contracted lower portion having a concave bottom, the second of said members being a substantially frusto-conical base attached at its smaller upper end to and extending around the smallest contraction of the bowl, so that the flaring upper portion of the bowl rises above any portion of the base, and the third of said members being a removable top fitted to the rim of the bowl, substantially as set forth.

2. A spittoon, composed solely of three integral sheet-metal members, one of said members being an imperforate flaring bowl provided with a contracted portion, said bowl being formed with a rounded interior both above and below the contracted portion, the second of said members being a base formed with a contracted approximately vertical flange fitted on the contracted portion of the bowl, and the third of said members being a removable top fitted to the flaring portion of the bowl, the outside of the spittoon having substantially the same shape between the edge of the removable top and the contraction of the bowl, as between the latter and the lower edge of the base, substantially as set forth.

In testimony that I claim the foregoing as my invention I have signed my name in presence of two subscribing witnesses.

HENRY J. VOGEL.

Witnesses:
JAS. P. HASLACH,
O. C. PATTERSON.